(12) United States Patent
Ritchie et al.

(10) Patent No.: US 11,419,324 B1
(45) Date of Patent: Aug. 23, 2022

(54) LIVE BAIT RETRIEVING AND HOOKING APPARATUS

(71) Applicants: Douglas James Ritchie, Paw Paw, MI (US); Joshua David Ritchie, Paw Paw, MI (US)

(72) Inventors: Douglas James Ritchie, Paw Paw, MI (US); Joshua David Ritchie, Paw Paw, MI (US)

( * ) Notice: Subject to any disclaimer, the term of this patent is extended or adjusted under 35 U.S.C. 154(b) by 3 days.

(21) Appl. No.: 17/301,020

(22) Filed: Mar. 22, 2021

(51) Int. Cl.
 *A01K 97/04* (2006.01)

(52) U.S. Cl.
 CPC ................... *A01K 97/04* (2013.01)

(58) Field of Classification Search
 CPC ............... A01K 97/04; A01K 97/00
 USPC ............................ 43/11, 55, 56, 4
 See application file for complete search history.

(56) References Cited

U.S. PATENT DOCUMENTS

| | | | |
|---|---|---|---|
| 2,082,754 A * | 6/1937 | Peterson | A01K 97/05 43/56 |
| 2,480,924 A * | 9/1949 | Heger | A01K 97/05 294/103.1 |
| 2,502,816 A * | 4/1950 | Bennek | A01K 97/05 43/4 |
| 2,531,551 A | 11/1950 | Brecht et al. | |
| 2,611,982 A * | 9/1952 | Sears | A01K 97/18 43/4 |
| 2,670,557 A | 3/1954 | Pachner | |
| 2,982,045 A * | 5/1961 | Highland | A01K 97/05 43/4 |
| 3,059,369 A | 10/1962 | Swanson | |
| 3,065,561 A | 11/1962 | Swanson | |
| 3,098,312 A * | 7/1963 | Shannon | A01K 97/04 43/4 |
| 3,354,575 A | 11/1967 | Darrow | |
| 3,753,308 A * | 8/1973 | Swanson | A01K 97/05 43/4 |
| 3,803,743 A | 4/1974 | Nalepka | |
| 3,879,879 A | 4/1975 | Bobo | |
| D237,881 S * | 12/1975 | Steadman | D8/13 |
| 3,958,356 A | 5/1976 | Clingan | |
| 4,060,923 A | 12/1977 | Schmitz | |
| 4,118,807 A | 10/1978 | McCauley | |
| D259,358 S | 5/1981 | Jones | |
| 4,290,221 A * | 9/1981 | Dotson, Sr. | A01K 97/18 43/55 |
| 5,465,522 A | 11/1995 | Varda | |

(Continued)

*Primary Examiner* — Timothy D Collins
*Assistant Examiner* — Maria E Graber
(74) *Attorney, Agent, or Firm* — Innovation Capital Law Group, LLP; Vic Lin

(57) ABSTRACT

A bait scoop allows an angler to retrieve live bait, hook the live bait while still in the bait scoop, and easily remove the hooked bait from the bait scoop. The bait scoop includes a scoop and a handle extending from a back of the scoop member. A plurality of front slots are formed in the scoop, where the slots are open at a top part of the scoop. The slots continuously extend from the top of the scoop, around the bottom, and partially up the back of the scoop to attached to a solid back portion thereof. Side slots are formed in sides of the scoop, where the side slots are open at the top of the scoop. Slotted cones are formed at a trench on a bottom interior of the scoop, where the slot in the scoop extends from the side slot to the interior of the scoop.

11 Claims, 17 Drawing Sheets

(56) References Cited

U.S. PATENT DOCUMENTS

2013/0139427 A1* 6/2013 Land ................. A01K 97/00
43/4

* cited by examiner

LIVE BAIT RETRIEVING AND HOOKING APPARATUS

BACKGROUND OF THE INVENTION

1. Field of the Invention

Embodiments of the invention relate generally to fishing accessories. More particularly, embodiments of the invention relate to a scoop for retrieving live bait from a live well or bait bucket, for example, and permitting insertion of a hook therein with easy removal of the hooked bait from the scoop.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Live bait, such as minnows, greenbacks, white bait, pin fish, and the like, are often used as bait for fishing. The live bait is often kept in a live well, bait bucket, or the like and needs to be retrieved by the angler and a hook is then inserted into the live bait.

There is currently no easy means of transferring live bait from the minnow bucket to the hook. Current methods involve a common mesh net scoop that is used to capture the live bait from the bucket. The fisherman must then, by hand, grab the slippery and floppy minnow out of the net and then hook the minnow. This results in minnows flopping out of the net or the fisherman's hand onto the floor of the boat or ground. Fisherman must then recapture the minnow for hooking. Time is wasted and minnows are lost in the current process.

Some conventional devices attempt to capture the minnow, but often include moving parts, springs, pivot joints, or the like, that can break or corrode in the fishing environment.

In view of the foregoing, there is a need for an improved device for retrieving live bait and allowing for easy hooking of the bait and removal from the device.

SUMMARY OF THE INVENTION

Embodiments of the present invention provide a bait scoop comprising a scoop having a back face, opposing side faces, a front face, a bottom face and an open top providing access to an interior of the scoop; a trench formed along an interior surface of the bottom face on the interior of the scoop; a plurality of fingers extending down from the open top along the front face, across the bottom face and up the back face, each of the plurality of fingers connected with a solid part of the back face, the solid part extending from where the plurality of fingers attach thereto up the open top; and a plurality of slots configured between adjacent ones of the plurality of fingers, the plurality of slots configured to permit a fishing hook to be inserted therethrough.

In some embodiments, the bait scoop further comprises a side slot extending down at least one of the opposing side faces, from the open top and across a portion of the bottom face. In some embodiments, the side slot is disposed on each of the opposing side faces of the scoop.

In some embodiments, the bait scoop further comprises solid faces extending along the front face from the open top downward to the bottom face, extending across the bottom face, and extending upward from the bottom face to form part of the solid part of the back face, the solid faces being disposed on opposite ends of the front, bottom and back faces; a side slot extending down at least one of the opposing side faces, from the open top and across a portion of the bottom face; a first cone member extending inward from an inside surface of the front face at each of the solid faces, at a predetermined distance from the trench; a second cone member extending inward from an inside surface of the back face at each of the solid faces, at the predetermined distance from the trench; and a cone slot formed between the first cone member and the second cone member, the cone slot communicating with the side slot.

In some embodiments, the bait scoop further comprises a handle extending from the solid part of the back face.

Embodiments of the present invention further provide a bait scoop comprising a scoop having a back face, opposing side faces, a front face, a bottom face and an open top providing access to an interior of the scoop; a trench formed along an interior surface of the bottom face on the interior of the scoop; a plurality of fingers extending down from the open top along the front face, across the bottom face and up the back face, each of the plurality of fingers connected with a solid part of the back face, the solid part extending from where the plurality of fingers attach thereto up the open top; a handle extending from the solid part of the back face; a plurality of slots configured between adjacent ones of the plurality of fingers, the plurality of slots configured to permit a fishing hook to be inserted therethrough; and a side slot extending down at least one of the opposing side faces, from the open top and across a portion of the bottom face, wherein the side slot is disposed on each of the opposing side faces of the scoop.

Embodiments of the present invention also provide a bait scoop comprising a scoop having a back face, opposing side faces, a front face, a bottom face and an open top providing access to an interior of the scoop; a trench formed along an interior surface of the bottom face on the interior of the scoop; a handle extending from a solid part of the back face; solid faces extending downward along the front face from the open top to the bottom face, extending across the bottom face, and extending upward from the bottom face to form part of the a part of the back face, the solid faces being disposed on opposite ends of the front, bottom and back faces; a side slot extending down at least one of the opposing side faces, from the open top and across a portion of the bottom face; a first cone member extending inward from an inside surface of the front face at each of the solid faces, at a predetermined distance from the trench; a second cone member extending inward from an inside surface of the back face at each of the solid faces, at the predetermined distance from the trench; and a cone slot formed between the first cone member and the second cone member, the cone slot communicating with the side slot.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
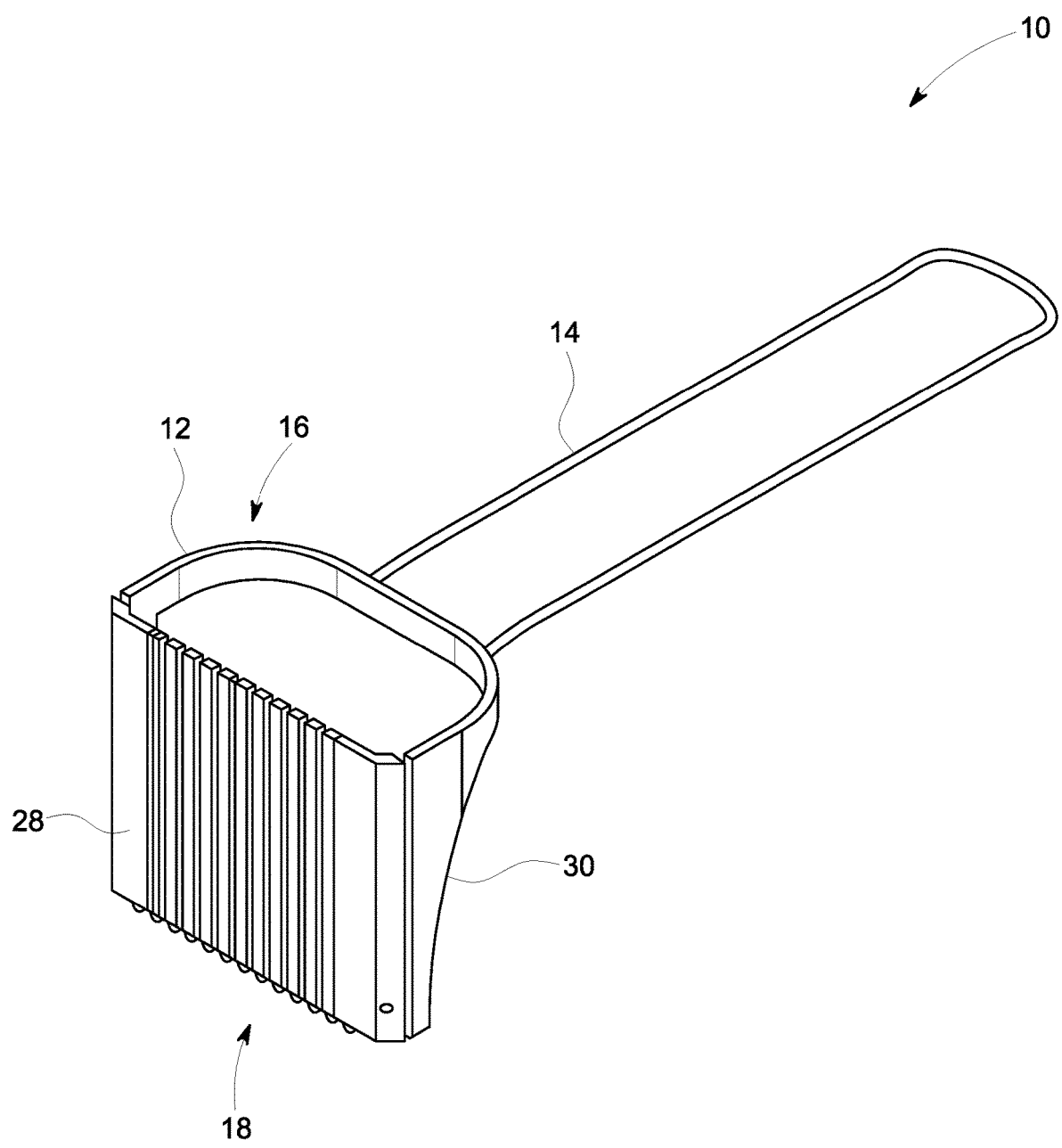
FIG. 1 illustrates a perspective view of a bait scoop according to an exemplary embodiment of the present invention.
Figure 2:
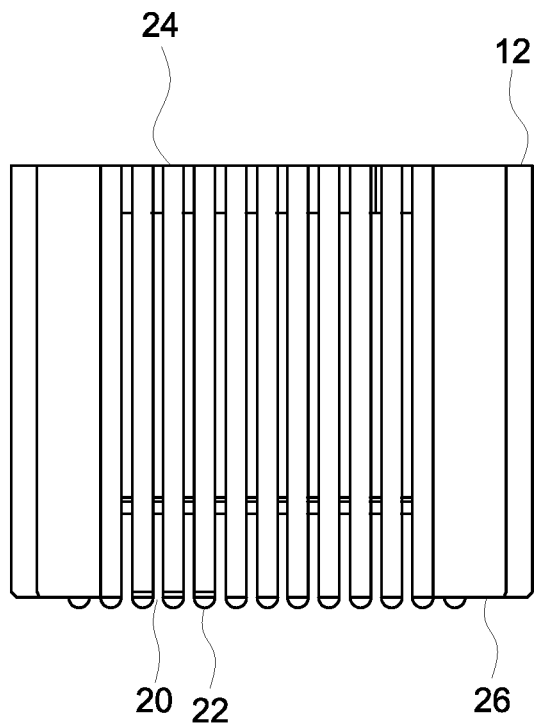
FIG. 2 illustrates a front view of the bait scoop of FIG. 1.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a bait scoop that allows an angler to retrieve live bait from a live well or bait bucket, hook the live bait while still in the bait scoop, and easily removed the hooked bait from the bait scoop. The bait scoop includes a scoop member and a handle extending from a back of the scoop member. A plurality of front slots are formed in the scoop, where the slots are open at a top part of the scoop. The slots continuously extend from the top of the scoop, around the bottom, and partially up the back of the scoop to attached to a solid back portion thereof. Side slots are formed in sides of the scoop, where the side slots are open at the top of the scoop. Slotted cones are formed at a trench on a bottom interior of the scoop, where the slot in the scoop extends from the side slot to the interior of the scoop.

Referring to FIGS. 1 through 6, a bait scoop 10 includes a scoop portion 12 (also referred to simply as scoop 12) and a handle 14 extending from a back side 30 of the scoop 12. A live bait, such as a minnow, greenback, white bait, pin fish, or the like, may be scooped into an open top end 16 of the scoop 12 to be retained by a partially closed bottom end 18.

A front side 28 of the scoop 12 can include a solid portion 26 formed at each side end of the front side 28 of the scoop 12. A plurality of fingers 22 can extend from the top 24 of the scoop 12 and can extend to the bottom 18 of the scoop 12 (see FIG. 2), move along a bottom of the scoop 12 (see FIG. 4) and then partially up the back side 30 of the scoop 12 (see FIG. 6). Slots 20 are formed between the fingers 22, where the slots are open at the top 24 of the scoop and are continuous all the way to the solid part of the back side 30 of the scoop 12. The slots 20 may extend from about 1 inch to about 3 inches or more up the back side 30 of the scoop 12. The amount of extension of the slots 20 up the back side 30 of the scoop 12 may depend on the intended use, where minnows may only need a short extension of the slots 20 up the back side 30, while the use of larger or taller bait, such as pin fish, may require the slots 20 to extend further up the back side 30 of the scoop 12.

Figure 5:
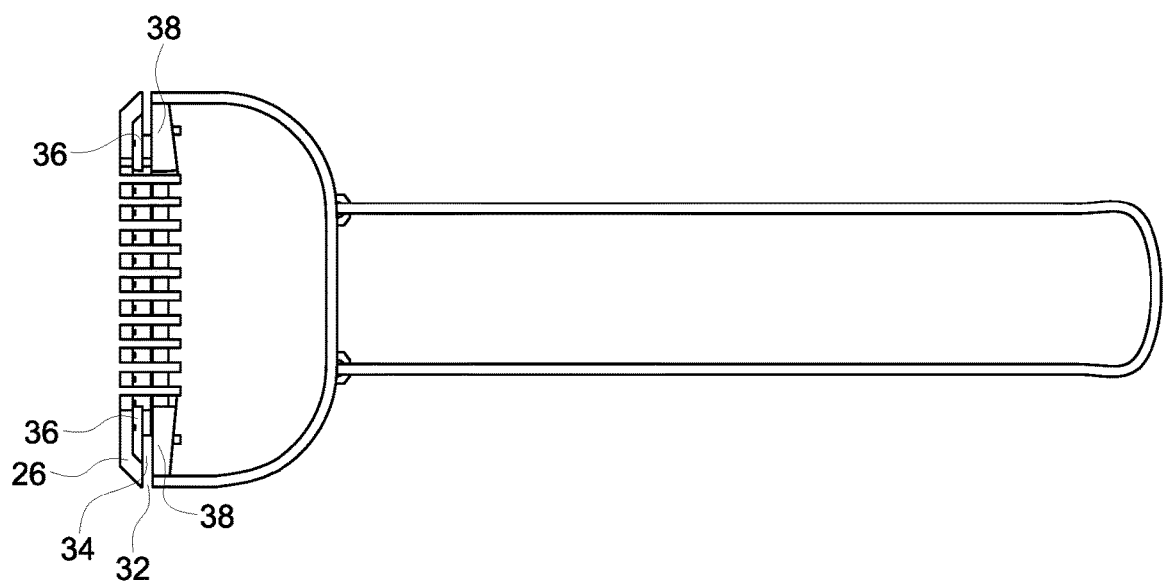
FIG. 5 illustrates top view of the bait scoop of FIG. 1.
Figure 6:
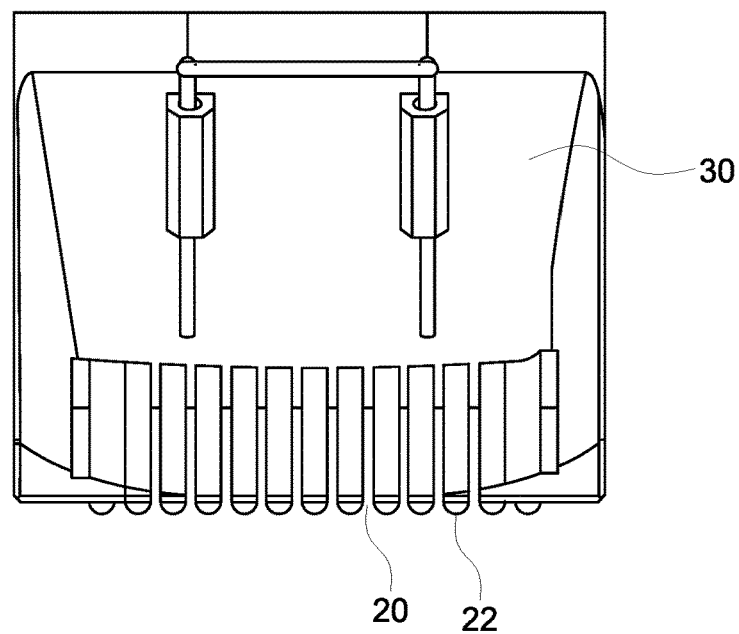
FIG. 6 illustrates a back view of the bait scoop of FIG. 1.
Figure 7:
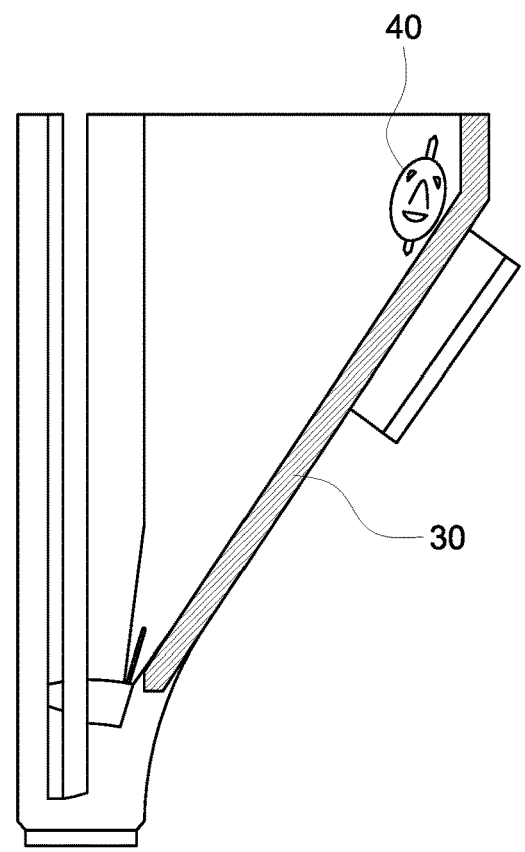
FIG. 7 illustrates a cross-sectional view a first use of the bait scoop of FIG. 1, showing a minnow sliding down from an open top to a trench at the bottom of the bait scoop.

As best seen in FIG. 5, behind the solid portion 26 of the front side 28 of the scoop 12, on the inside of the scoop 12, a slotted cone can be formed from a first cone member 36, extending from the solid portion 26 at the front of the scoop 12, and a second cone member 38 extending from the back of the scoop 12. A cone slot 34 is disposed between the cone members 36, 38.

Figure 3:
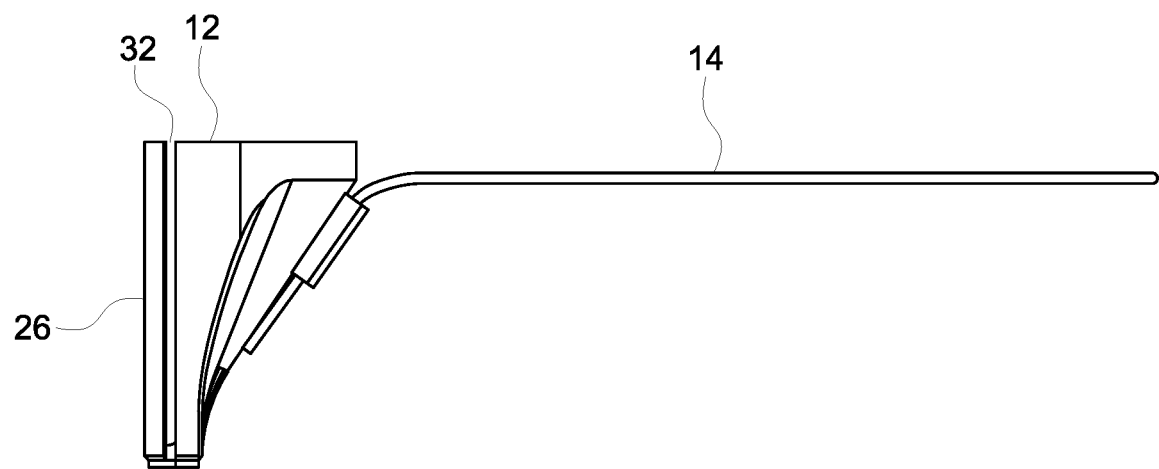
FIG. 3 illustrates a side view of the bait scoop of FIG. 1.
Figure 4:
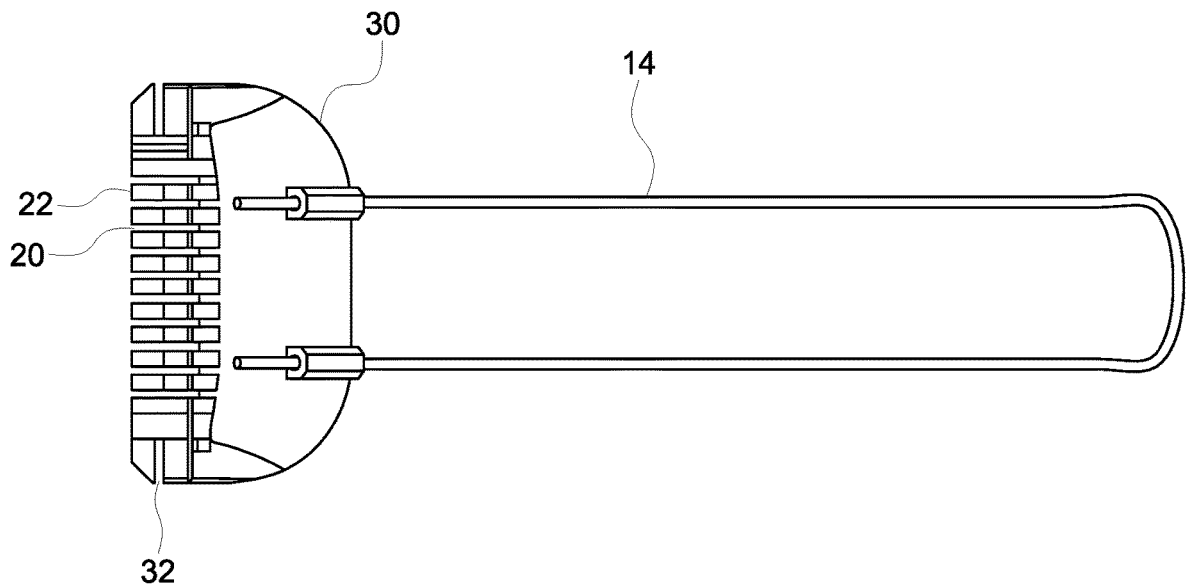
FIG. 4 illustrates a bottom view of the bait scoop of FIG. 1.

A side slot 32, as best seen in FIGS. 3 through 5, can be open at the top 24 of the scoop 12 and can continue to the bottom of the scoop and extend partially into the bottom as shown in FIG. 4. The side slot 32 can communicate with the cone slot 34 as best seen in FIG. 5.

The handle 14 can attach scoop 12 via various means and may be permanently attached to the scoop 12 or may be removable therefrom.

Typically, the scoop 12 and handle 14 can be formed from a rigid or semi-rigid plastic or metal, such as stainless steel. Semi-rigid, as used herein, may refer the ability of the fingers to retain their orientation with the slots therebetween, without flexing unless an external force is applied. Semi-rigid also can include sufficient rigidity to allow the hooking action of a hook being inserted into the live bait.

Figure 8:
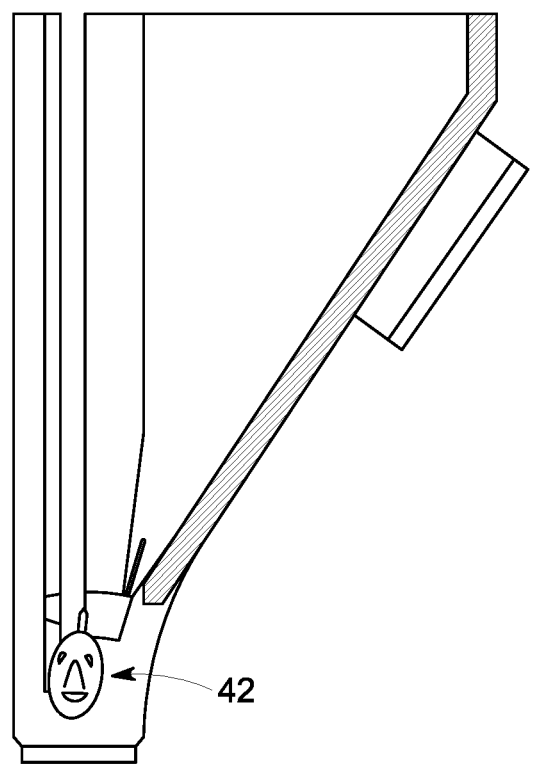
FIG. 8 illustrates the cross-sectional view of FIG. 7 with the minnow in the trench, reach to be hooked through its back.
Figure 9:
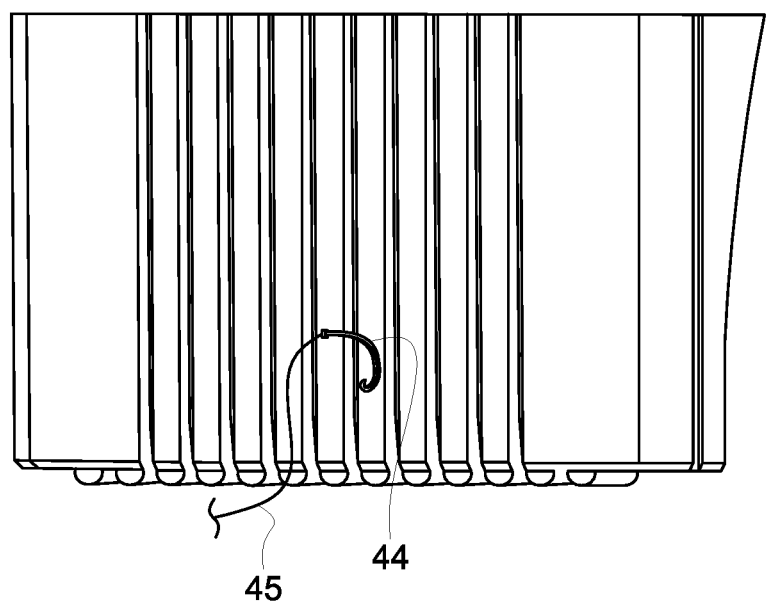
FIG. 9 illustrates a hook being inserted into one of the front slots, above the minnow in the trench.
Figure 10:
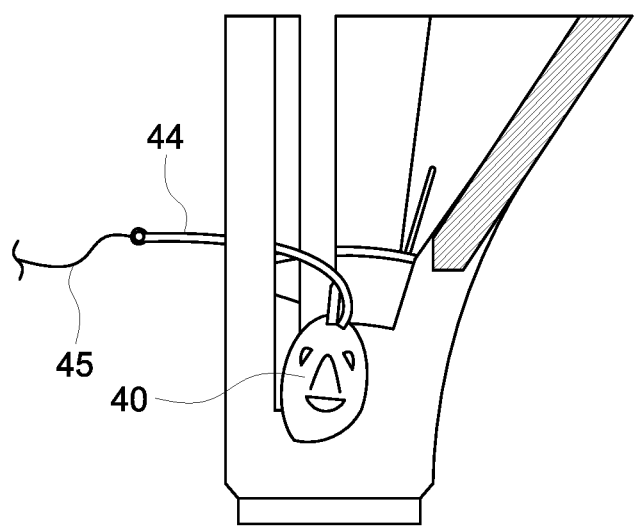
FIG. 10 illustrates the hook, as inserted in FIG. 9, hooking onto the back of the minnow.
Figure 11:
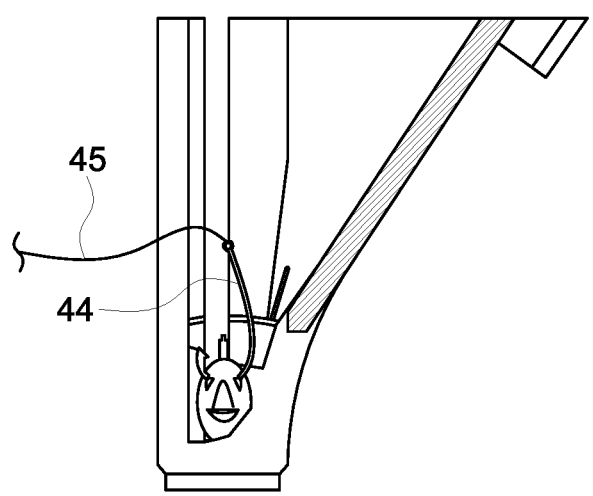
FIG. 11 illustrates the hook being moved with the fishing line to a removal position.
Figure 12:
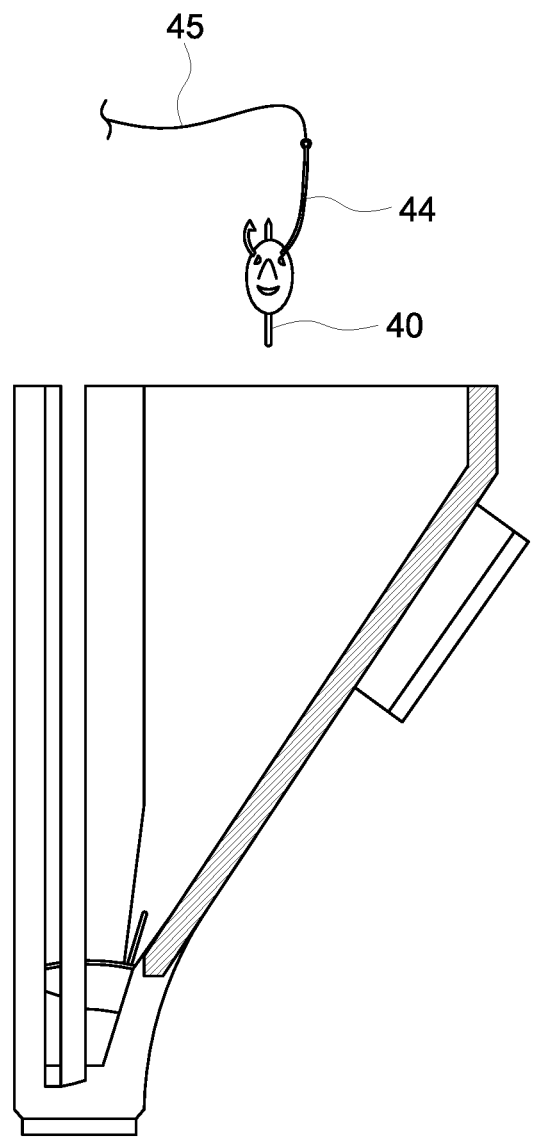
FIG. 12 illustrates the minnow being removed from the bait scoop.
Figure 13:
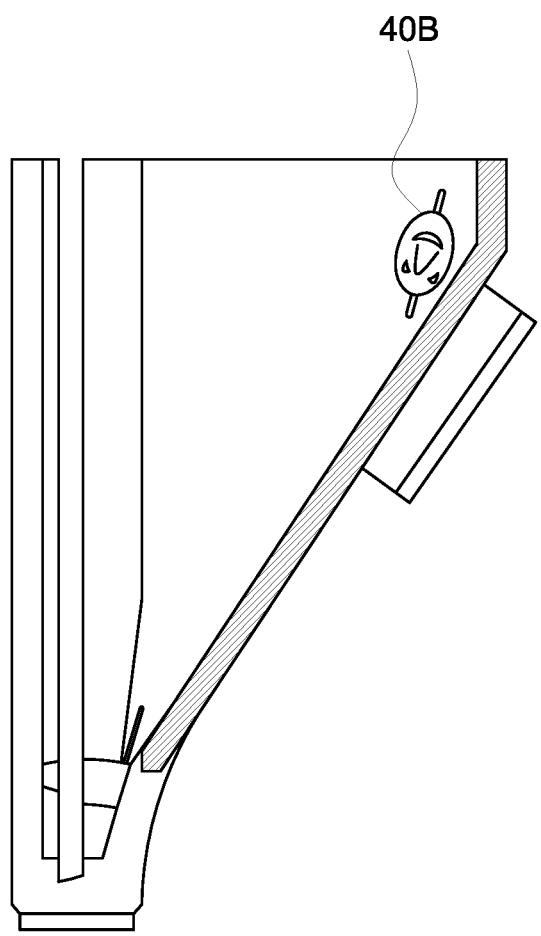
FIG. 13 illustrates a cross-sectional view of a second use of the bait scoop of FIG. 1, showing a minnow sliding down, upside down, from the open top to a trench at the bottom of the bait scoop.

Referring now to FIGS. 7 through 12, a first use case is described in detail. Live bait, such as minnow 40 is received in the scoop and slides down the back side 30 thereof. The minnow 40 is received in the trench 42 formed at the bottom of the scoop, as shown in FIG. 8. The user can view the minnow through the slots in the front of the scoop and insert a hook 44 into a slot where the user desires to hook the minnow 40. In this case, the minnow 40 is right side up (belly down) so the user can use the slots at the front to hook the minnow 40 through the back as shown in FIG. 10. The hook 44, via the fishing line 45, can be moved into the interior of the scoop and the minnow 40 can be pulled out of the scoop as shown in FIG. 12.

Figure 14:
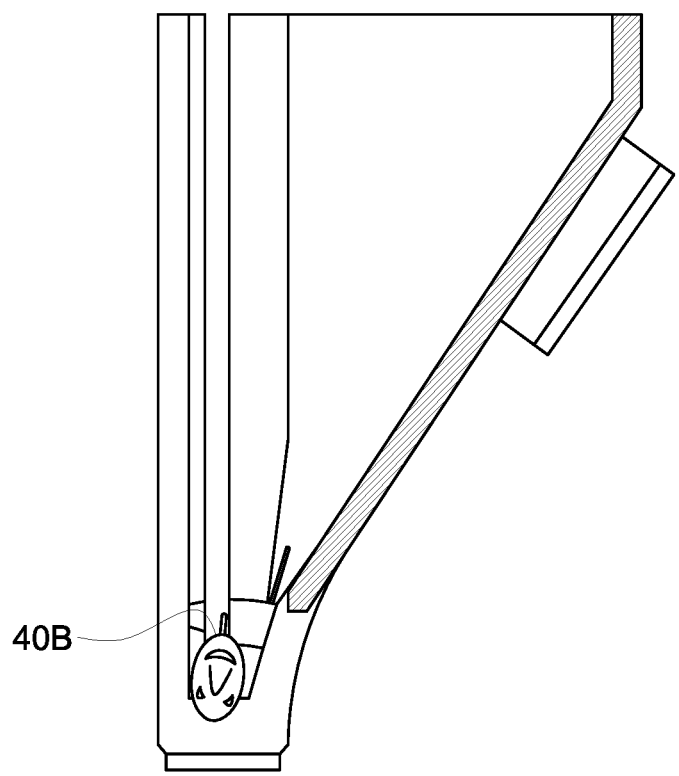
FIG. 14 illustrates the minnow, upside down, in the trench, ready to be hooked.
Figure 15:
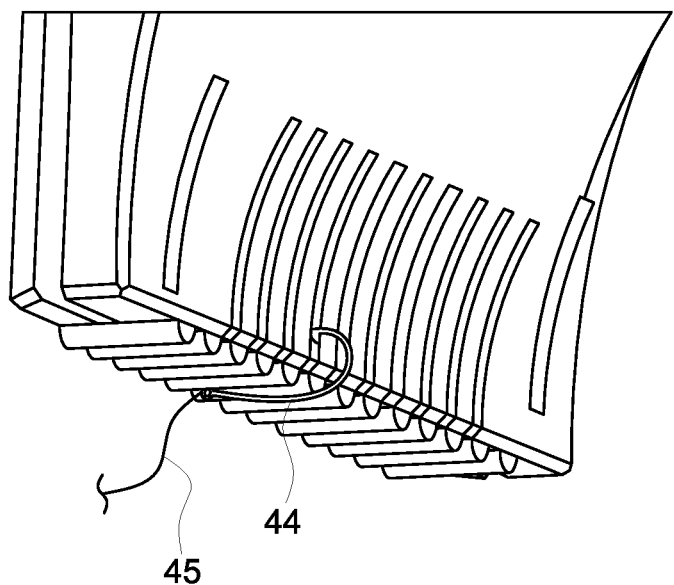
FIG. 15 illustrates a back, bottom perspective view of the bait scoop of FIG. 1, showing the hook moving into one slot to hook the minnow.
Figure 16:
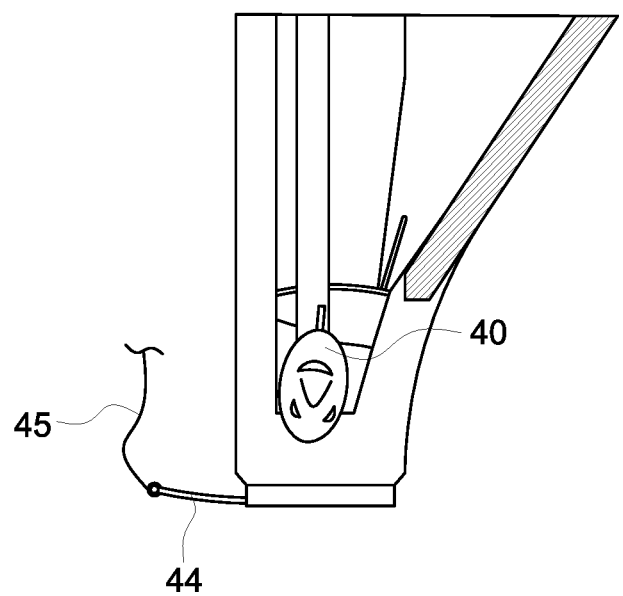
FIG. 16 illustrates the upside down minnow being hooked in the back.
Figure 17:
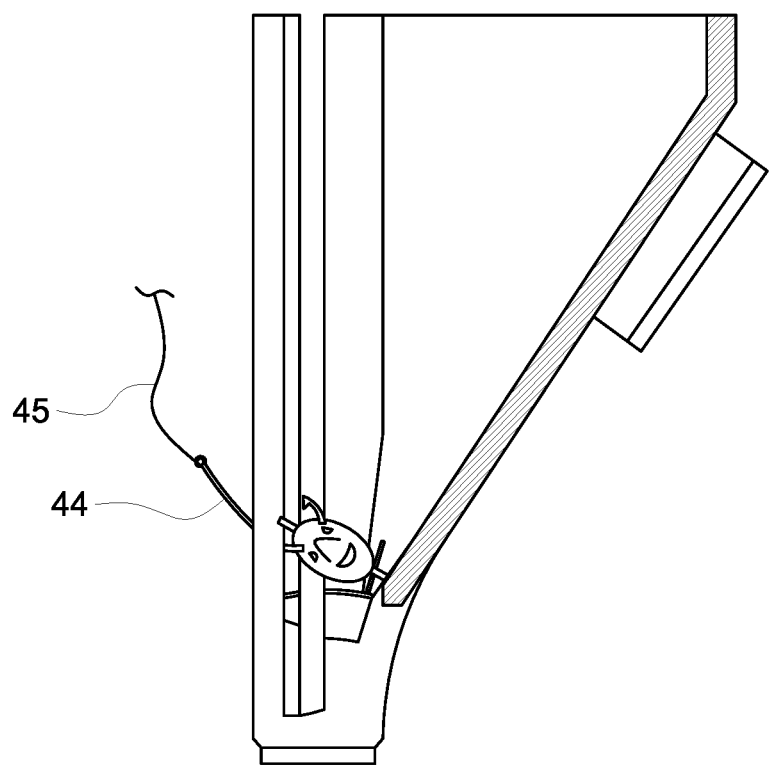
FIG. 17 illustrates the hook being moved to a removal position.
Figure 18:
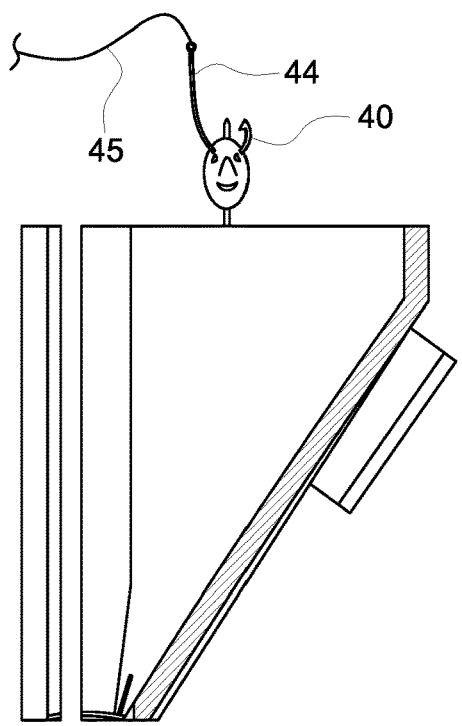
FIG. 18 illustrates the minnow being removed from the bait scoop.
Figure 19:
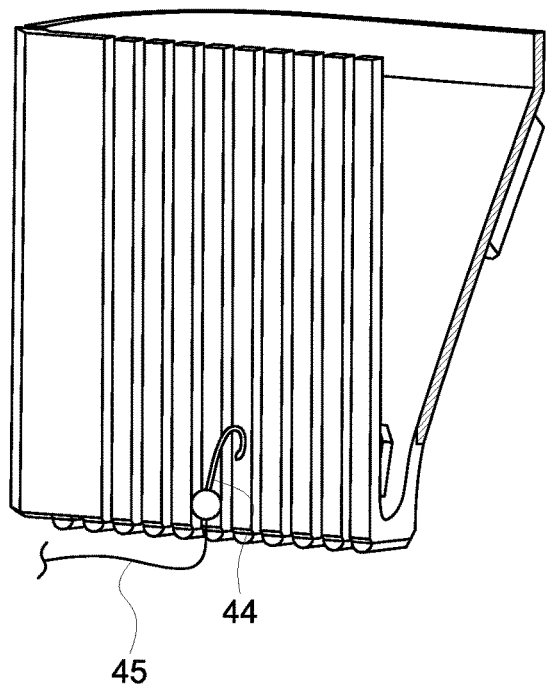
FIG. 19 illustrates a jig head being used to hook the minnow in the trench in the bait scoop of FIG. 1, where, in this case, the minnow is upside down as in FIGS. 13-17.

Referring to FIGS. 13 through 18, a second use case is described in detail. Here, the minnow 40B is scooped upside down and falls, in that position, into the trench as shown in FIG. 14. The hook 44 may be inserted into the slot from the bottom as shown in FIG. 15 to hook the back of the minnow in a manner similar to that above in FIGS. 7 through 12, where the minnow was captured right side up. Thus, the bait scoop 10 can be used to hook the minnow through the back when the minnow is captured both upside down and right side up. The minnow can be lifted out of the scoop in a similar manner as described above to release the live bait on the hook as shown in FIG. 18.

Figure 20:
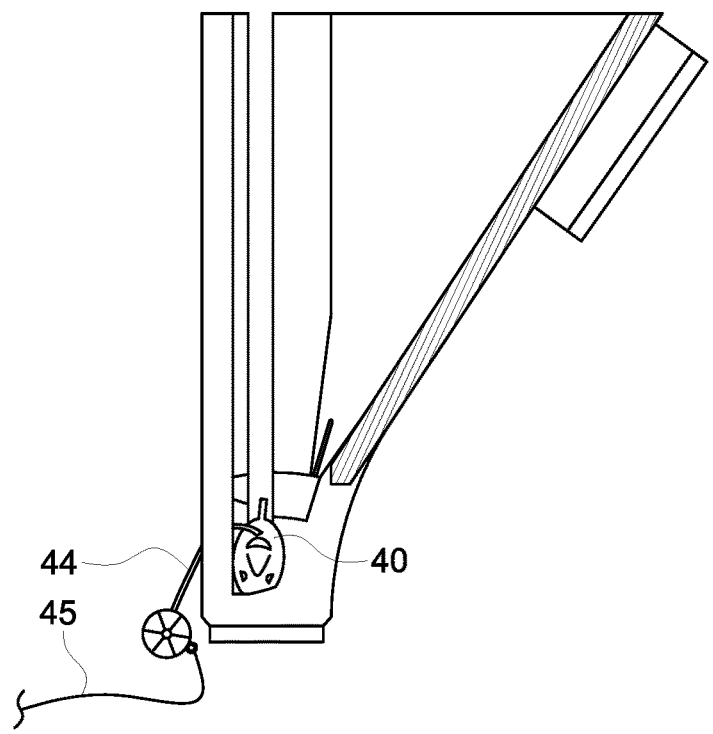
FIG. 20 illustrates the jig head hook being inserted into the mouth of the minnow.
Figure 21:
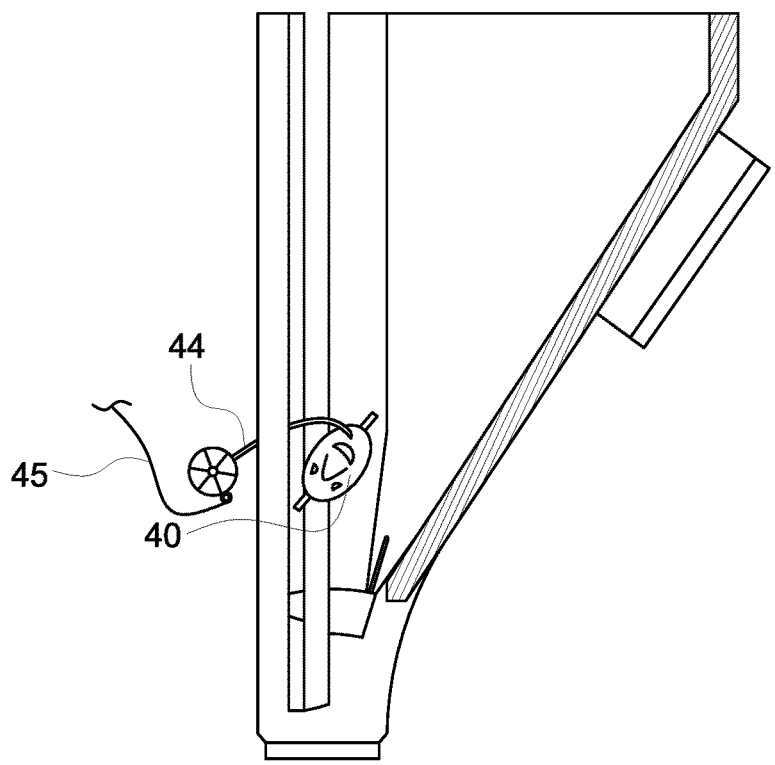
FIG. 21 illustrates a removal position, where the weighted end of the jig head remains outside of the bait scoop.
Figure 22:
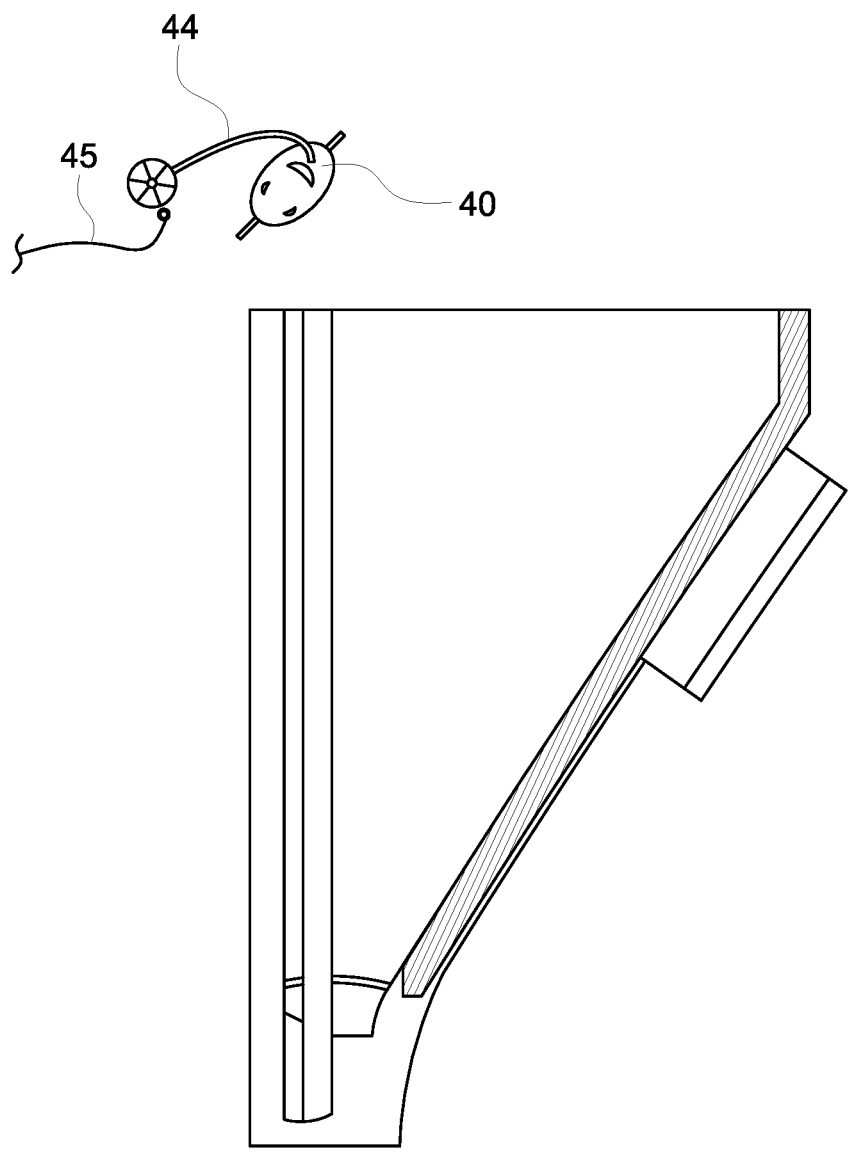
FIG. 22 illustrates the minnow being removed from the bait scoop.

Referring now to FIGS. 19 through 22, when the hook 44 has a weight on the end, such as with jig heads, the entire hook may not fit through the slots as in the above two use cases. Thus, in a third use case, the minnow 40 may be hooked in the head as shown in FIG. 20 and the hook slid along the front face of the scoop as shown in FIG. 21 to remove the hooked minnow 40 from the scoop. Depending on the location of the weight and the length of the hook, a jig head may also hook the minnow in the back, as shown above. Further, a standard hook (without weights) may also hook the minnow 40 in the head in the manner shown in FIG. 20.

Figure 23:
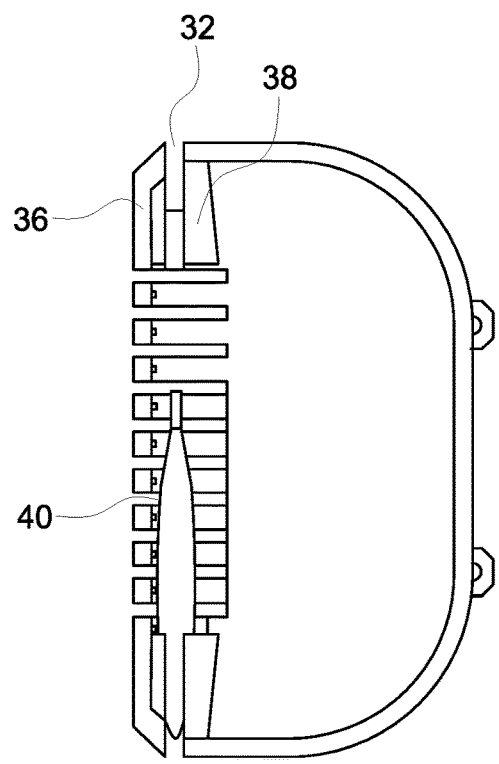
FIG. 23 illustrates a minnow in the trench of the bait scoop with its head slid into a slotted cone disposed at each end of the trench.
Figure 24:
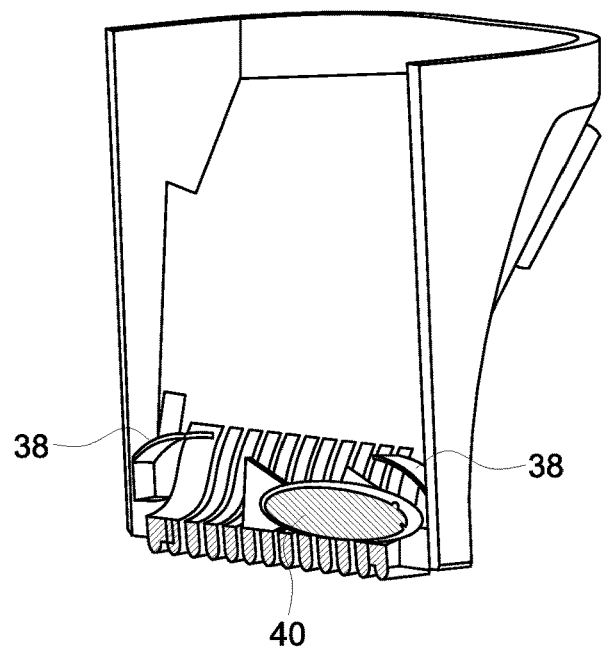
FIG. 24 illustrates a cross-sectional view of the bait scoop with the minnow in the slotted cone end of the trench.
Figure 25:
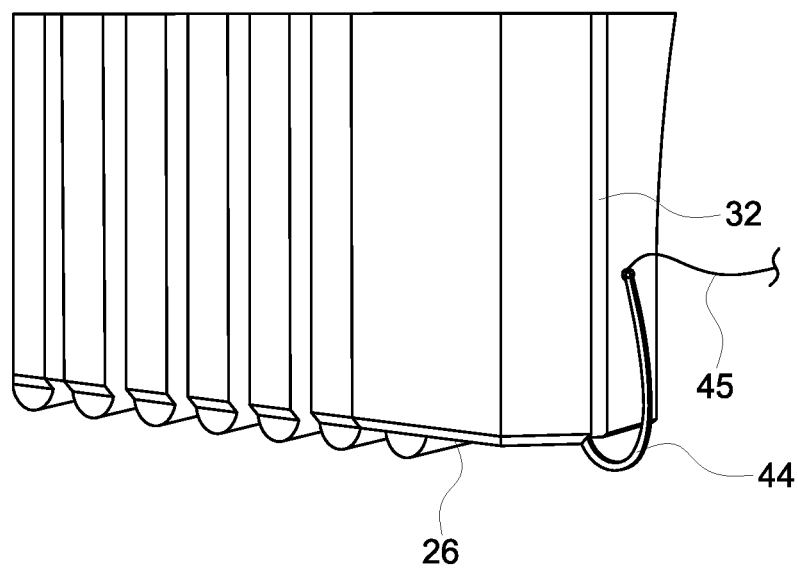
FIG. 25 illustrates a hook being inserted into a side slot of the bait scoop.
Figure 26:
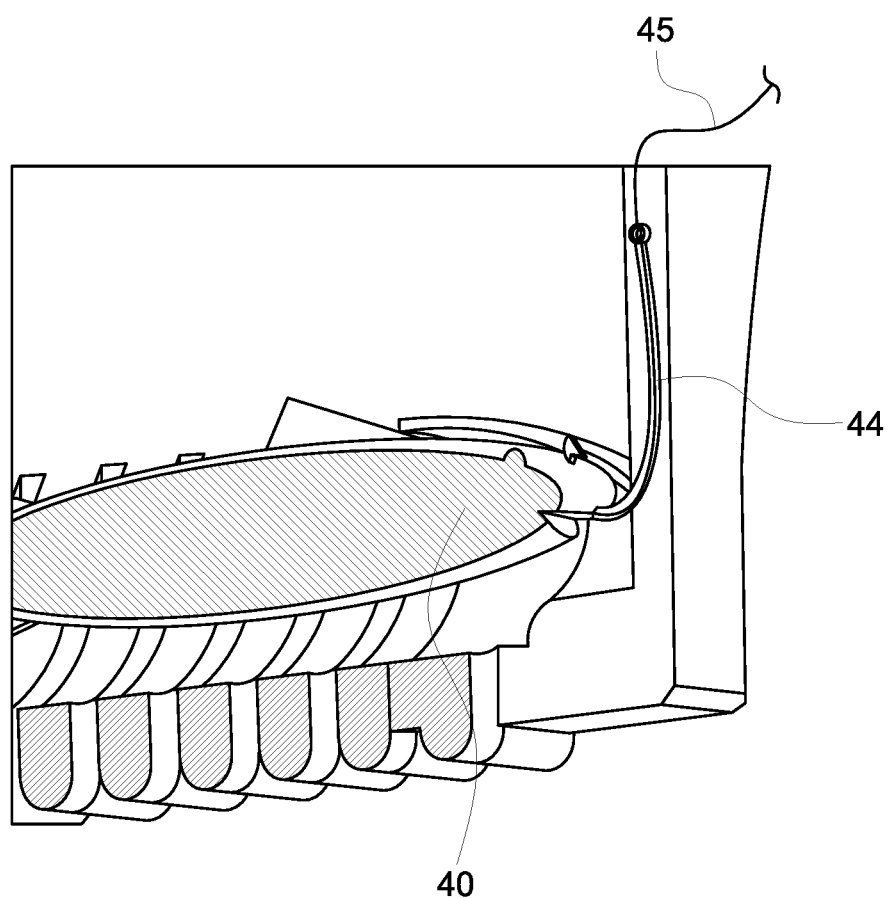
FIG. 26 illustrates the hook being hooked into the mouth of the minnow as the minnow is held in position by the slotted cone as upward pressure is applied by the hooking action.
Figure 27:
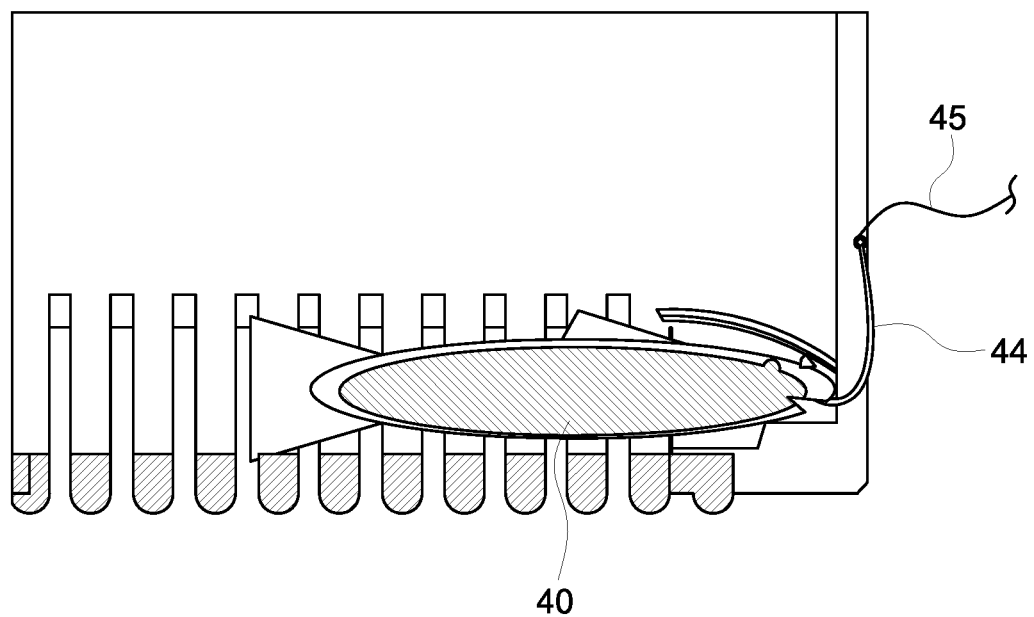
FIG. 27 illustrates the hook fully inserted into the minnow.
Figure 28:
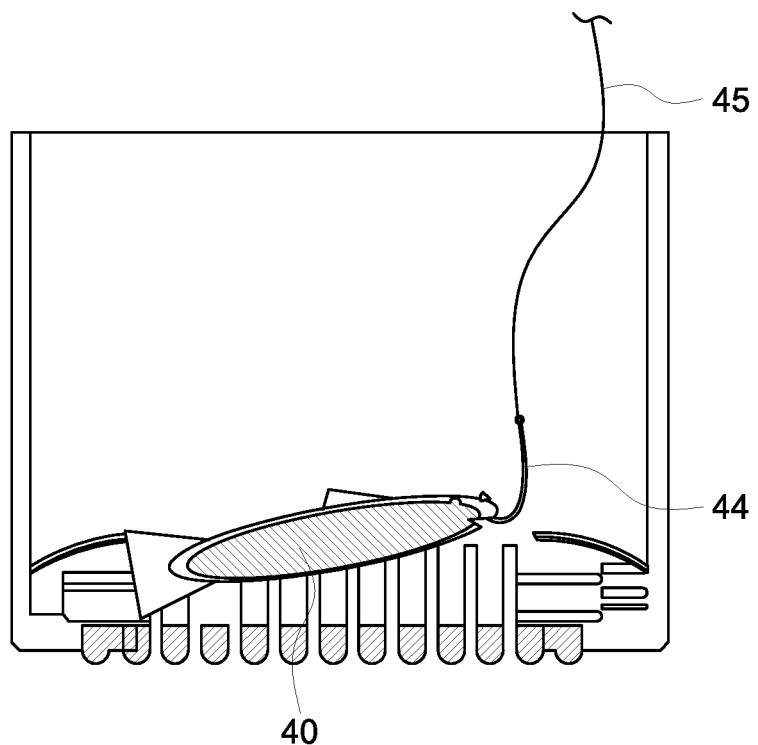
FIG. 28 illustrates the minnow being removed from the slotted cone end of the trench of the bait scoop and the minnow being removed from the bait scoop.

Referring to FIGS. 23 through 28, a fourth use case, where a slotted cone holds the minnow in place so that a hook can be inserted, is described. The minnow 40 is received in the trench and is slide, head-first, toward one side of the trench so that the head of the minnow fits between the first cone member 36 and the second cone member 38 as shown in FIG. 23. The hook 44 can be inserted from the bottom as shown in FIG. 25 to hook the fish in the mouth, as shown in FIG. 26. The hook 44 may also be inserted from the top down, which may be advantageous when the minnow 40 is upside down. Once the minnow 40 is hooked, the minnow 40 may be slid out from between the cone members 36, 38 and removed from the scoop. Because side slot 32 extends up to the top of the scoop, the fishing line 45 can be moved into the interior of the scoop to allow the hook 44 to easily lift the minnow 40 out of the scoop.

In summary, the bait scoop 10 can be used to dip minnows out of a minnow bucket, funnel them to the bottom of the device into a position to be easily hooked. The device allows full hook access to the minnow and easy removal once hooked. It does not matter if the minnow is facing up or down, hook access works both ways. This will enable an angler to hook minnows without touching them. The bait scoop 10 can also control the process so no minnows are lost in transference from minnow bucket to the hook. The design also allows for hook placement anywhere on the body of the minnow or in the mouth as discussed in the non-limiting use case scenarios above.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A bait scoop comprising:
   a scoop having a back face, opposing side faces, a front face, a bottom face and an open top providing access to an interior of the scoop;
   a trench formed along an interior surface of the bottom face on the interior of the scoop;
   a plurality of slots extending down from the open top, along the front face, across the bottom face and up the back face, terminating at a solid part of the back face, the plurality of slots configured to permit a fishing hook to be inserted therethrough, the plurality of slots being open to an exterior environment above the open top; and
   a side slot extending down at least one of the opposing side faces, from the open top and across a portion of the bottom face, the side slot being open to the exterior environment above the open top, wherein
   at least a portion of the front face, the bottom face and the back face create a plurality of fingers, each defined between adjacent ones of the plurality of slots, the plurality of fingers extending down from the open top along the front face, across the bottom face and up the back face, each of the plurality of fingers connected with a solid part of the back face, the solid part extending from where the plurality of fingers attach thereto up the open top.

2. The bait scoop of claim 1, wherein the side slot is disposed on each of the opposing side faces of the scoop.

3. The bait scoop of claim 1, further comprising a handle extending from the solid part of the back face.

4. The bait scoop of claim 1, wherein first and second solid faces are defined by respective first and second portions of the front face, bottom face and back face lacking any of the plurality of slots, each of the first and second portions being integral along the front face, bottom face and back face and further being integrally connected with the solid part of the back face, each of the first and second portions being disposed adjacent respective side faces.

5. The bait scoop of claim 4, further comprising:
   first and second cone members formed from first and second first cone portions, each extending inward from an inside surface of the front face at each of the first and second solid faces, at a predetermined distance from the trench, and first and second cone portions, each extending inward from an inside surface of the back face at each of the first and second solid faces, at the predetermined distance from the trench; and
   first and second cone slots formed in each of the first cone member and the second cone member, each cone slot communicating with a respective one of the side slot, wherein
   the predetermined distance is a distance from an inside surface of the bottom face sufficient to hold a head portion of a bait therein.

6. A bait scoop comprising:
   a scoop having a back face, opposing side faces, a front face, a bottom face and an open top providing access to an interior of the scoop;
   a trench formed along an interior surface of the bottom face on the interior of the scoop;
   a plurality of slots extending down from the open top, along the front face, across the bottom face and up the back face, terminating at a solid part of the back face, the plurality of slots configured to permit a fishing hook to be inserted therethrough, the plurality of slots being open to an exterior environment above the open top;
   a handle extending from the solid part of the back face; and
   a side slot extending down each of the opposing side faces, from the open top and across a portion of the bottom face, the side slot being open to the exterior environment above the open top, wherein
   at least a portion of the front face, the bottom face and the back face create a plurality of fingers, each defined between adjacent ones of the plurality of slots, the plurality of fingers extending down from the open top along the front face, across the bottom face and up the back face, each of the plurality of fingers connected with a solid part of the back face, the solid part extending from where the plurality of fingers attach thereto up the open top.

7. The bait scoop of claim 6, wherein first and second solid faces are defined by respective first and second portions of the front face, bottom face and back face lacking any of the plurality of slots, each of the first and second portions being integral along the front face, bottom face and back face and further being integrally connected with the solid part of the back face, each of the first and second portions being disposed adjacent respective side faces.

8. The bait scoop of claim 7, further comprising:

first and second cone members formed from first and second first cone portions, each extending inward from an inside surface of the front face at each of the first and second solid faces, at a predetermined distance from the trench, and first and second cone portions, each extending inward from an inside surface of the back face at each of the first and second solid faces, at the predetermined distance from the trench; and first and second cone slots formed in each of the first cone member and the second cone member, each cone slot communicating with a respective one of the side slot, wherein the predetermined distance is a distance from an inside surface of the bottom face sufficient to hold a head portion of a bait therein.

9. A bait scoop comprising:

a scoop having a back face, opposing side faces, a front face, a bottom face and an open top providing access to an interior of the scoop;

a trench formed along an interior surface of the bottom face on the interior of the scoop;

a handle extending from a solid part of the back face;

first and second solid faces defined by first and second portions of the front face, bottom face and back face, each of the first and second portions being integral along the front face, bottom face and back face and further being integrally connected with a solid part of the back face, each of the first and second portions being disposed adjacent respective side faces a side slot extending down at least one of the opposing side faces, from the open top and across a portion of the bottom face, the side slot being open to an exterior environment above the open top;

first and second cone members formed from first and second first cone portions, each extending inward from an inside surface of the front face at each of the first and second solid faces, at a first predetermined distance from the trench, and first and second cone portions, each extending inward from an inside surface of the back face at each of the first and second solid faces, at the first predetermined distance from the trench; and first and second cone slots formed in each of the first cone member and the second cone member, each cone slot communicating with a respective one of the side slot, wherein the first predetermined distance is a distance from an inside surface of the bottom face sufficient to hold a head portion of a bait therein.

10. The bait scoop of claim 9, wherein the first and second cone members extend inward, from the opposing side faces, at a second predetermined distance.

11. The bait scoop of claim 9, further comprising:

a plurality of slots extending down from the open top, along the front face, across the bottom face and up the back face, terminating at a solid part of the back face, the plurality of slots configured to permit a fishing hook to be inserted therethrough, the plurality of slots being open to the exterior environment above the open top, wherein at least a portion of the front face, the bottom face and the back face create a plurality of fingers, each defined between adjacent ones of the plurality of slots, the plurality of fingers extending down from the open top along the front face, across the bottom face and up the back face, each of the plurality of fingers connected with a solid part of the back face, the solid part extending from where the plurality of fingers attach thereto up the open top.

* * * * *